United States Patent
Brown et al.

(10) Patent No.: US 6,803,333 B2
(45) Date of Patent: Oct. 12, 2004

(54) AIRBAG FABRICS MADE FROM HIGH DENIER PER FILAMENT YARNS

(75) Inventors: Jeffrey Steven Brown, Stroud (GB); John J. Barnes, Dymock (GB)

(73) Assignee: Invista North America S.a.r.l., Wilimington, DE (US)

( * ) Notice: Subject to any disclaimer, the term of this patent is extended or adjusted under 35 U.S.C. 154(b) by 308 days.

(21) Appl. No.: 10/168,206

(22) PCT Filed: Dec. 19, 2000

(86) PCT No.: PCT/US00/34398

§ 371 (c)(1),
(2), (4) Date: Jun. 14, 2002

(87) PCT Pub. No.: WO01/46502

PCT Pub. Date: Jun. 28, 2001

(65) Prior Publication Data

US 2003/0019535 A1 Jan. 30, 2003

(30) Foreign Application Priority Data

Dec. 20, 1999 (GB) .............................. 9930193

(51) Int. Cl.⁷ .............................................. D03D 13/00
(52) U.S. Cl. ............... 442/203; 139/383 R; 139/384 R; 139/387 R; 139/389; 280/728.1; 280/743.1; 428/34.1; 428/34.3; 428/34.5; 428/34.6; 428/34.7; 428/35.7; 428/36.1; 442/203; 442/212; 442/213; 442/215

(58) Field of Search ................ 428/34.1, 34.3, 428/34.5, 34.6, 34.7, 35.7, 36.1; 280/728.1, 743.1; 442/203, 212, 213, 215; 139/383 R, 384 R, 387 R, 389

(56) References Cited

U.S. PATENT DOCUMENTS

| | | | |
|---|---|---|---|
| 5,424,123 A | | 6/1995 | Geirhos et al. |
| 5,508,073 A | | 4/1996 | Krummheuer et al. |
| 5,637,385 A | | 6/1997 | Mizuki et al. |
| 5,713,601 A | * | 2/1998 | Bonigk .................... 280/801.1 |
| 6,022,817 A | * | 2/2000 | Lewis et al. ................ 442/189 |
| 6,153,545 A | | 11/2000 | LaLonde et al. |

FOREIGN PATENT DOCUMENTS

| | | |
|---|---|---|
| JP | 8060425 | 3/1996 |
| JP | 8325888 | 12/1996 |

* cited by examiner

Primary Examiner—Arti R. Singh

(57) ABSTRACT

An airbag fabric is made from multifilament yarns each comprised of a plurality of individual filaments, with each filament having a linear density in the range from about eight (8) decitex to eleven (11) decitex per filament, and more preferably a linear density in the range from about nine (9) decitex to about eleven (11) decitex per filament. The fabric has a circular bend stiffness in the range of about four (4) Newtons to about seven (7) Newtons, as measured in accordance with ASTM method D4032-94.

6 Claims, No Drawings

AIRBAG FABRICS MADE FROM HIGH DENIER PER FILAMENT YARNS

BACKGROUND OF THE INVENTION

1. Field of the Invention

This invention relates to fabrics for airbags woven from high decitex per filament multifilament synthetic polymer yarns.

2. Description of Related Art

Fabrics used in airbags should exhibit high strength, low air permeability, and the ability to fold to the least necessary volume. U.S. Pat. No. 5,508,073 (Krummheuer et al.) teaches that advantages in air permeability and specific stiffness are possessed by fabrics made from multifilament polyamide yarns having individual filament fineness of less than five (5) decitex per filament, and more particularly, having individual filament fineness of less than four (4) decitex per filament.

Airbag fabric constructed from blended yarns containing a portion of high decitex per filament yarns and a portion of low decitex per filament yarns are known from published PCT application WO 98-31854 (LaLonde et al.).

The high decitex per filament component is selected from the range of five (5) to fourteen (14) decitex per filament, while the lower linear density per filament yarn is selected from the range of 1.5 to five (5) decitex per filament. The ratio of the components in the LaLonde et al. blended yarn is selected from the range of 1:1 to 1:5 (coarse: fine).

It is believed advantageous to provide a fabric for an airbag made from a multifilament polyamide yarn which takes advantage of the strength inherent in filaments of a high decitex yet which provides the foldability and air permeability performance of filaments with a low decitex.

SUMMARY OF THE INVENTION

The present invention is directed to a woven fabric for use in manufacturing an airbag. The fabric is made from a plurality synthetic polymer multifilament yarns extending in substantially perpendicular warp and weft directions. Each multifilament yarn comprises a plurality of individual filaments with each individual filament having a linear density in the range from about eight (8) decitex to about eleven (11) decitex per filament, and more preferably, a linear density in the range from about nine (9) decitex to about eleven (11) decitex per filament. The fabric has a circular bend stiffness in the range of about four (4) Newtons to about seven (7) Newtons, as measured in accordance with ASTM method D4032-94.

Preferably, the multifilament yarns have a linear density (yarn titer) in the range from about two hundred (200) to about six hundred (600) decitex, and more preferably, in the range from about two hundred fifty (250) decitex to about five hundred fifty (550) decitex.

Such multifilament yarns are woven in substantially perpendicular warp direction and weft directions, as in a plain weave fabric. The typical fabric sett is from eighteen (18) to twenty-five (25) yarns per centimeter in either warp or weft directions. Fabrics of this type have a circular bend stiffness, also known as "King" stiffness, of 0.9 pounds of force (four Newtons) to about 1.6 pounds of force (7.1 Newtons) as measured according to ASTM method D4032-94. Fabrics constructed from the preferred yarns have an areal density of about one hundred twenty-five (125) grams per square meter to about two hundred fifty (250) grams per square meter.

Fabrics made of heavy decitex per filament yarns in accordance with the present invention provide airbags that are lighter in weight and have improved foldability as measured by circular bend stiffness, the fabric's resistance to circular bending.

Suitable synthetic polymers from which preferred high decitex filament yarns are prepared include: nylon 66, nylon 6, nylon 46, nylon 12, nylon 612, and polyesters like 2GT, 2GN, 3GN and 3GT. Nylon 66 is an especially preferred polymer for the high decitex multifilament yarns in accordance with the present invention.

DESCRIPTION OF THE PREFERRED EMBODY

The present invention is directed to an improved synthetic polymer woven fabric for use in airbags. The fabric is constructed from a plurality of high decitex multifilament yarns in both the warp and weft directions of the fabric.

Preferably each individual filament in a multifilament yarn is a high tenacity filament with a linear density in a range of about eight (8) decitex per filament to about eleven (11) decitex per filament. More preferred are individual filaments having a linear density of between nine (9) decitex and eleven (11) decitex.

The preferred high decitex multifilament yarns have a linear density (yarn titer) in a range from about two hundred (200) to about six hundred (600) decitex. More preferably, the high decitex multifilament yarn has a linear density in a range from about in the range from about two hundred fifty (250) decitex to about five hundred fifty (550) decitex.

The high decitex multifilament yarns are woven in substantially perpendicular warp direction and weft directions, as in a plain weave fabric. The typical fabric sett is from eighteen (18) to twenty-five (25) yarns per centimeter in either warp or weft directions. Fabrics of this type have a circular bend stiffness, also known as "King" stiffness, of 0.9 pounds of force (4.0 Newtons) to about 1.6 pounds of force (7.1 Newtons) as measured according to ASTM method D4032-94. This ASTM method is hereby incorporated by reference.

Fabrics constructed in accordance with the present invention have an areal density of about one hundred twenty-five (125) grams per square meter to about two hundred fifty (250) grams per square meter. Fabrics made of heavy decitex per filament yarns in accordance with the present invention provide airbags that are lighter in weight and have improved foldability as measured by the fabric's resistance to circular bending.

Surprisingly, it has been found that a plain weave fabric made from high decitex multifilament yarns in both the warp and weft directions with an individual filament linear density in the range from about eight (8) decitex per filament to about eleven (11) decitex are not high in stiffness. Based on measurement of fabric circular bend stiffness, fabrics in accordance with the present invention have a reduced circular bend stiffness and easy foldability superior to conventional airbag fabrics. Circular bend stiffness is directly related to ease of foldability of fabrics and thus correlate to smaller airbag package size and to better unfolding of the airbag in deployment.

Fabrics made from higher decitex per filament yarns in accordance with the present invention are believed to achieve an optimum balance between fabric seam strength, fabric weight and weaving intensity. Prior art airbag fabrics using lower decitex filament yarns require a higher yarn density and more yarns per centimeter if such fabrics are to exhibit the tensile strength required to provide necessary seam strength. The advantage of such low mass fabrics is, however, offset by the higher cost of high weaving intensity.

A second advantage achieved by fabrics of the present invention is the lighter-weight that reduced yarn linear density provides. Increasingly, lighter-weight fabrics are used to lower airbag momentum and potential injury to vehicle occupants caused by normal airbag deployment. Depowered airbags and lighter fabrics both play a role in this effort. The present invention is able to provide a light-weight fabric of high strength and foldability from higher decitex per filament yarns than yarns of prior use in airbag fabrics.

A further advantage of the present invention is the ease with which are filaments are woven into fabrics without filament damage. In weaving via entirely conventional means (water jet, air jet and rapier) fewer broken filaments due handling are encountered. As a result, the weaver using higher decitex per filament yarns in accordance with the present invention is afforded productivity gains and cost advantages not available with much finer decitex filaments yarns.

A yet further advantage in fabric performance resulting from the use of high decitex per filament yarn include a surface area to volume ratio lower than prior art yarns. Treatments like fabric scouring to remove process finishes are accomplished at higher productivity as a result of lower filament surface to volume ratio.

No new or special processes are needed to post-treat fabrics made in accordance with the present invention invention. Specifically, when fabric coatings are used, like silicone rubber at twenty (20) to forty (40) grams per square meter, these coatings modify the air permeability of the fabrics to achieve the industry standard of less than ten (10) liters per square decimeter per minute at an applied test differential pressure of five hundred (500) Pascals. Entirely conventional coatings and means to apply the coatings are appropriate for the fabrics of the present invention. Fabrics of the present invention are amenable to coating using knife, roller, dip, extrusion and other coating methods, with coating materials such as silicones, polyurethanes, rubbers, blends of these materials and other coating products useful for airbag application.

It is believed the advantages of high decitex per filament yarns in fabrics for airbags may be realized from multifilament yarns prepared using a variety of synthetic polymers. The high decitex multifilament yarns used for the fabrics of the present invention may be prepared from any of nylon 66, nylon 6, nylon 46, nylon 12, nylon 612, polyester 2GT (polyethylene terephthalate), polyester 2GN (polyethylene naphthalate), polyester 3GN (polytrimethylene naphthalate) and polyester 3GT (polytrimethylene terephthalate polymers. Nylon 66 is an especially preferred polymer for the fabrics made of high decitex multifilament yarns in accordance with the present invention.

Test Methods

The circular bend stiffness (or "King" stiffness) test method is a standard procedure for fabrics specified by the above-incorporated ASTM method designated D4032-94. The method forces a flat folded fabric swatch through a standard orifice. The maximum force required to push the fabric through the orifice is correlated to the fabric stiffness or its resistance to circular bending. The results, a force measurement, are reported directly in pounds of force or Newtons (with one pound of force being equal to 4.447 Newtons).

Yarn Preparation

All yarns used in the construction of the fabrics summarized in The Table were melt spun from homopolymer nylon 66. A heat stabilizer additive package was present in the polymer. Each filament of the yarn was of round cross section, and contained no delusterant. The yarns were manufactured using a conventional melt spinning process with coupled draw stages and windup. The yarns were oiled with a finish at 0.8% by weight of yarn. The nominal denier per filament for Examples 1, 2, 3 and 7 was 8.24 denier (9.15 decitex). Denier per filament was measured taking the weight in grams of four hundred fifty (450) meters of yarn, multiplying by twenty (20) and dividing by the number of filaments in the weighed yarn sample. Decitex is equal to denier multiplied by the fraction $^{10}/_9$.

Fabric Preparation

Each of the fabrics for Examples 1 through 5 in the Table were woven using a conventional rapier weaving loom. The fabrics for Examples 6 and 7 in the Table were woven using a conventional water jet weaving loom. All fabrics were woven in a plain weave without fabric size at settings and speeds typical of commercial weaving practice. After weaving the fabrics were scoured in water and dried and heat-set using conventional commercial practice methods. All fabrics were uncoated.

The Examples are summarized in the Table.

TABLE

| Example No. | Yarn denier (yarn dtex) | Fil. Count | Denier per fil (dtex/fil) | Warp/inch × Weft/inch | Cover factor | Fabric density g/m$^2$ | Fabric gage Mil (mm) | Circular Bend Stiffness lb. Force (Newton) |
|---|---|---|---|---|---|---|---|---|
| 1 | 280 (311.5) | 34 | 8.2 (9.2) | 53 × 52 | 0.71 | 142 | 9.9 (0.25 | 0.95 (4.2) |
| 2 | 280 (311.5) | 34 | 8.2 (9.2) | 55 × 57 | 0.76 | 152 | 9.9 (0.25 | 1 (4.4) |
| 3 | 280 (311.5) | 34 | 8.2 (9.2) | 61 × 60 | 0.82 | 164 | 9.9 (0.25 | 1.45 (6.4) |
| 4 (COMPARATIVE) | 210 (235) | 68 | 3.1 (3.4) | 63 × 66 | 0.81 | 136 | 9.9 (0.25 | 0.63 (2.8) |
| 5 (COMPARA- | 315 (350) | 96 | 3.3 (3.7) | 60 × | 0.91 | 191 | 11.02 (0.28 | 1.62 (7.2) |

TABLE-continued

| Example No. | Yarn denier (yarn dtex) | Fil. Count | Denier per fil (dtex/fil) | Warp/inch × Weft/inch | Cover factor | Fabric density g/m² | Fabric gage Mil (mm) | Circular Bend Stiffness lb. Force (Newton) |
|---|---|---|---|---|---|---|---|---|
| TIVE) | | | | 60 | | | | |
| 6 (COMPARATIVE) | 420 (470) | 68 | 6.2 (6.9) | 49 × 49 | 0.86 | 202 | 9.9 (0.25) | 1.92 (8.5) |
| 7 | 420 (470) | 51 | 8.2 (9.2) | 49 × 49 | 0.86 | 202 | 9.9 (0.25) | 1.47 (6.5) |

EXAMPLES 1, 2 and 3 (INVENTION)

Examples 1, 2, and 3 exhibit the properties of light-weight fabrics made from high decitex per filament yarns. In each case a 280 denier (311.5 decitex) nylon 66 yarn of 8.24 denier (9.11 decitex) per filament (34 filaments in each yarr bundle) was tightly woven into a fabric of the following construction:

| | Construction | |
|---|---|---|
| Example | Warp × Weft (Yarns per inch) | Warp Weft (Yarns per cm) |
| 1 | 53 × 52 | 20.8 × 20.5 |
| 2 | 55 × 57 | 21.6 × 22.4 |
| 3 | 61 × 60 | 24.0 × 23.6 |

Example 1 was a 53 yarns-per-inch by 52 yarns-per-inch fabric with properties reported in the Table. The areal density of 142 grams per square meter was quite comparable with very light fabrics constructed from much fine denier per filament yarns. The fabric cover factor was 0.71, determined according to the definition disclosed in PCT Publication W098-00592 (Bowen et al., assigned to Milliken Research Corp.). Fabric cover factor varies linearly with fabric areal weight. The circular bend stiffness of Example 1 was 4.2 Newtons.

Example 2 was a 55 yarns-per-inch by 57 yarns-per-inch fabric with properties reported in the Table. The fabric cover factor was 0.76. The areal density of 152 grams per square meter was quite comparable with very light fabrics constructed from much fine denier per filament yarns. The circular bend stiffness of Example 2 was 4.4 Newtons.

Example 3 is a 61 yarns-per-inch by 60 yarns-per-inch fabric with properties reported in the Table. The fabric cover factor was 0.82. The areal density of 164 grams per square meter was comparable to light-weight fabrics constructed from much finer denier per filament yarns. The circular bend stiffness of Example 3 was 6.4 Newtons.

EXAMPLE 4 (COMPARATIVE)

Yarn of 210 denier (235 decitex), 3.1 denier (3.4 decitex) per filament, (68 filaments in each yarn bundle) was woven into a fabric having 63 warp yarns-per-inch (24.8 per centimeter) and 66 weft yarns-per-inch (26 per centimeter). The fabric cover factor was 0.81. The fabric areal density was 136 grams per square meter, characteristic of very light-weight commercial airbag fabrics. This fabric had a circular bend stiffness of 2.8 Newtons.

EXAMPLE 5 (COMPARATIVE)

Yarn of 315 denier (350 decitex), 3.3 denier (3.7 decitex) per filament, (96 filaments in each yarn bundle), was woven into a fabric having 60 warp yarns-per-inch and 60 weft yarns-per-inch (23.6/cm×23.6/cm). The fabric cover factor was 0.91. The fabric areal density was 191 grams per square meter, typical of commercial airbag fabrics from fine decitex per filament yarns. This fabric had a circular bend stiffness of 7.2 Newtons.

EXAMPLE 6 (COMPARATIVE)

Yarn of 420 denier (470 decitex), 6.2 denier (6.9 decitex) per filament, (68 filaments in each yarn bundle) was woven into a fabric having 49 warp yarns-per-inch and 49 weft yarns-per-inch (19.3 per centimeter×19.3 per centimeter). The fabric cover factor was 0.86. The fabric areal density was 202 grams per square meter, typical of commercial airbag fabrics. This fabric had a circular bend stiffness of 8.5 Newtons.

EXAMPLE 7 (INVENTION)

Yarn of 420 denier (470 decitex), 8.2 denier (9.2 decitex) per filament, (51 filaments in each yarn bundle) was woven into a fabric having 49 warp yarns-per-inch and 49 weft yarns-per-inch (19.3 per centimeter×19.3 per centimeter). The fabric cover factor was 0.86. The fabric areal density was 202 grams per square meter, typical of commercial airbag fabrics. This fabric had a circular bend stiffness of 6.5 Newtons.

Discussion

The fabric of Comparative Example 6 was made of a multifilament yarn with a linear density of 6.2 denier (6.9 decitex) per filament and had a circular bend stiffness of 8.5 Newtons. By contrast, the fabric of Invention Example 7 was made of a multifilament yarn with a linear density 8.2 denier (9.2 decitex) per filament and had a circular bend stiffness of 6.5 Newtons. Surprisingly, the circular bend stiffness for fabric of Invention Example 7 is only about seventy-six percent (76%) of the prior art fabric of Comparative Example 6. This reduction in fabric bending resistance translates into superior ease of folding for an airbag constructed of a fabric made from the high decitex per filament yarns in accordance with the present invention.

The fabric of Comparative Example 5 was made of a multifilament yarn with a linear density of 3.3 denier (3.7 decitex) per filament and had a circular bend stiffness of 7.2 Newtons. By contrast, the fabric of Invention Example 3 was made of a multifilament yarn with a linear density of 8.2 denier (9.2 decitex) per filament and had a circular bend stiffness of 6.4 Newtons. The circular bend stiffness for fabric of Invention Example 3 was only about eighty-nine percent (89%) of the circular bend stiffness for the prior art fabric of Comparative Example 5. This again resulted in superior ease of folding for an airbag constructed of a fabric made from the high decitex per filament yarns in accordance with the present invention.

What is claimed is:

1. A woven fabric for use in manufacturing an airbag, the fabric being made from a plurality synthetic polymer multifilament yarns extending in substantially perpendicular warp and weft directions, wherein the improvement comprises:

each said multifilament yarn itself comprising a plurality of individual filaments, each filament having a linear density in the range from about eight (8) decitex to about eleven (11) decitex per filament, said fabric having a circular bend stiffness in the range from about four (4) Newtons to about seven (7) Newtons, as measured in accordance with ASTM method D4032-94.

2. The fabric of claim 1 wherein each multifilament yarn has a linear density in the range from about two hundred (200) to about six hundred (600) decitex.

3. The fabric of claim 2 wherein each multifilament yarn has a linear density in the range from about two hundred fifty (250) decitex to about five hundred fifty (550) decitex.

4. The fabric of claim 1 wherein each filament having a linear density from about nine (9) decitex, and wherein the fabric has a fabric sett in the range from about eighteen (18) to about twenty-five (25) yarns per centimeter in both the warp and weft directions and an areal density in the range from about one hundred twenty-five (125) grams per square meter to about two hundred fifty (250) grams per square meter.

5. The fabric of claim 1 wherein each multifilament yarn is made from a polymer selected from the group consisting of: nylon 66; nylon 6; nylon 4,6; nylon 12; nylon 6,12; polyester 2GT; polyester 2GN; polyester 3GN; and polyester 3GT.

6. The fabric of claim 1, wherein each filament has a linear density in the range from about nine (9) decitex to about eleven (11) decitex.

* * * * *